Dec. 7, 1954    C. E. ADAMS ET AL    2,696,196
CONTROL VALVE FOR HYDRAULIC APPARATUS
Filed Feb. 18, 1949    5 Sheets-Sheet 1

INVENTOR.
CECIL E. ADAMS
ELLIS H. BORN
BY
Herschel C. Omohundro
attorney

INVENTOR.
CECIL E. ADAMS
ELLIS H. BORN

Dec. 7, 1954   C. E. ADAMS ET AL   2,696,196
CONTROL VALVE FOR HYDRAULIC APPARATUS
Filed Feb. 18, 1949   5 Sheets-Sheet 4

INVENTOR.
CECIL E. ADAMS
ELLIS H. BORN
BY
Herschel C. Omohundro
Attorney

Dec. 7, 1954

C. E. ADAMS ET AL 2,696,196

CONTROL VALVE FOR HYDRAULIC APPARATUS

Filed Feb. 18, 1949

INVENTOR.
CECIL E. ADAMS
ELLIS H. BORN
BY
Herschel C. Omohundro
Attorney

United States Patent Office 2,696,196
Patented Dec. 7, 1954

2,696,196

CONTROL VALVE FOR HYDRAULIC APPARATUS

Cecil E. Adams and Ellis H. Born, Columbus, Ohio, assignors to The Denison Engineering Company, Columbus, Ohio, a corporation of Ohio Application February 18, 1949, Serial No. 77,133

14 Claims. (Cl. 121—38)

This invention relates to hydraulic apparatus and is more particularly directed to a control valve for governing the operation of reversible fluid motors.

One of the objects of the present invention is to provide a control valve of the four-way type having additional refinements which will cause improved operation of the hydraulic system in which the control valve is arranged.

Another object of the invention is to provide a four-way control valve suitable for use in hydraulic systems employing extremely high pressures, the valve serving to eliminate or reduce shock and other undesirable reactions incident to the use of high pressures and their introduction into sections of the system containing fluid at lower pressures.

Another object of the invention is to provide a four-way control valve for use in governing the operation of a reversible fluid motor, the valve to be manually operated and having means for eliminating or reducing the shock incident to the connection of portions of the hydraulic system containing fluid at contrasting pressures.

A still further object of the invention is to provide a four-way valve having means whereby a portion of a hydraulic system containing fluid under high pressure may be connected to another portion of the system containing fluid at a lower pressure, the rate of connection being so controlled that the motion of the fluid in the lower pressure portion will be gradually accelerated.

Another object of the invention is to provide a four-way valve having inlet, forward and reverse motor and exhaust ports and a valve spool for establishing communication between predetermined sets of ports, the valve being so formed that one of the motor ports may be connected with an exhaust port while being at the same time in communication with the inlet port, the connection of the motor port with the outlet port being performed at an automatically controlled rate so that the pressure in the motor port and the inlet port will be progressively dissipated thus eliminating shock, which might otherwise result from the connection of portions of the system containing fluid, at greatly contrasting pressures.

It is another object of the invention to provide a four-way valve having inlet, motor and exhaust ports and valve means for establishing communication between predetermined sets of ports, the valve being further provided with means for applying pressure fluid to the valve means to prevent uncontrolled movement thereof when certain sets of ports are being connected, the movement of the valve means being so dependent on the pressure that the degree of communication increases as the pressure decreases.

Another object of the invention is to provide a hydraulic system containing a source of fluid, a reversible motor of the piston and cylinder type and a four-way control valve between the source of fluid and the fluid motor to control the operation thereof, the pressure source being such that in the event movement of the piston is resisted the fluid pressure in the system will increase, the four-way valve being so constructed that after the fluid pressure has increased the portion of the system and the power cylinder containing fluid at increased pressure may be connected to exhaust without disagreeable shock and noise, the valve having a movable element through the operation of which the pressure-containing portion of the system will be connected to exhaust at a controlled rate to limit any increase in pressure in the exhaust to a predetermined maximum, the movable element of the valve being exposed to and so affected by the pressure in the exhaust that the degree of communication between the pressure-containing portion and exhaust will be retarded in the event the pressure tends to increase.

Another object of the invention is to provide a hydraulic system of the type mentioned in the preceding paragraph, in which the control valve is constructed in such a manner that when a selected end of the power cylinder is to be connected with exhaust the degree of communication permitted by such connection will be determined by the pressure existing in such end of the cylinder and the parts of the system communicating therewith, a high pressure serving to retard the rate of establishment of communication and a declining pressure permitting the rate of establishment of communication to be accelerated.

Further objects and advantages of the present invention will be apparent from the following description, reference being had to the accompanying drawings wherein a preferred form of embodiment of the invention is clearly shown.

Figure 1:
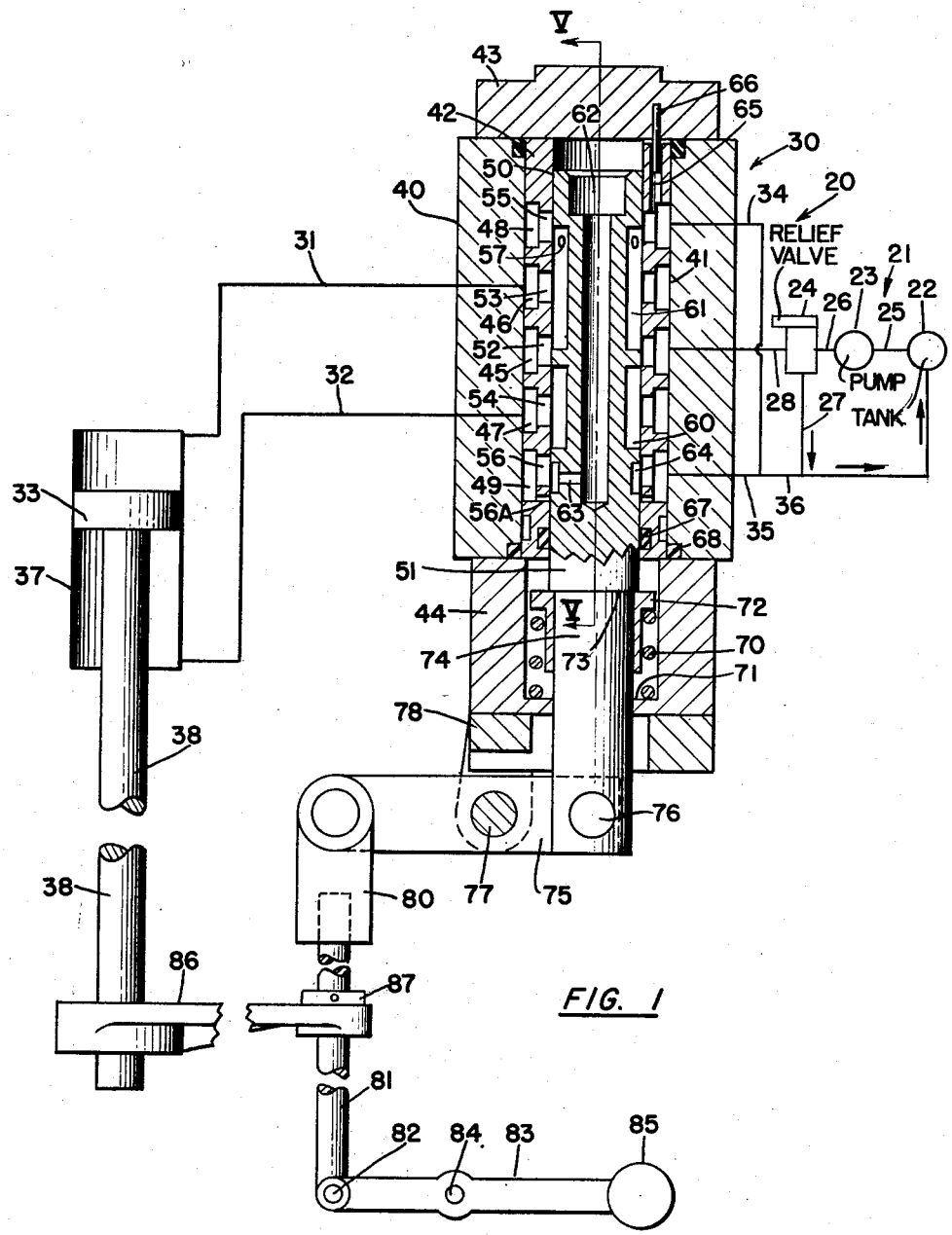
Fig. 1 is a diagrammatic view of a hydraulic system in which a four-way control valve formed in accordance with the present invention has been incorporated, this four-way control valve being shown in longitudinal section with the parts in positions to hold the movable element of a reversible fluid motor in the system in a retracted idle condition.

Referring more particularly to the drawings, the numeral 20 designates the hydraulic circuit in general, this circuit having a source of fluid 21 including a reservoir 22, a motor driven pump 23 and a relief valve 24, a line 25 extending from the reservoir to the pump and a line 26 extending from the latter to the relief valve. A return line 27 leads from the relief valve back to the reservoir 22 to permit fluid to be returned directly to the reservoir when the pressure in the hydraulic system increases to a predetermined value. Another line 28 leads from the relief valve to a four-way control valve designated generally by the numeral 30, this control valve having a pair of lines 31 and 32 leading therefrom to the upper and lower ends of a power cylinder 33. The valve 30 also has a pair of exhaust passages 34 and 35 formed therein which are joined together and connect with exhaust line 36 leading to the reservoir 22. The power cylinder 33 has a piston 37 disposed therein for sliding movement, this piston having a ram 38 projecting therefrom to do useful work.

In the operation of the hydraulic system, the valve 30 controls the flow of fluid from the source 21 to and from the ends of the power cylinder 33 to effect the reciprocation of the piston 37 and ram 38, the fluid flowing from the power cylinder being conducted back to the reservoir 22. The valve 30 includes a casing 40 having a longitudinal bore 41 formed therein, this bore receiving a liner 42 which is retained in the casing through friction and the provision of caps 43 and 44 at the upper and lower ends of the casing. The liner has a plurality of external annular grooves 45 to 49 inclusive, formed therein, groove 45 communicating with the inlet line 28, grooves 46 and 47 communicating with lines 31 and 32 and grooves 48 and 49 communicating with exhaust lines 34 and 35 respectively. The liner 42 is of sleeve-like form and includes a central bore 50, which slidably receives a valve spool 51 employed in controlling the fluid flow through the casing. The liner is further provided with longitudinally spaced rows of ports 52 to 56, inclusive, the rows each registering with one of the external grooves in the sleeve. Openings 52 register with the groove 45 and consequently receive oil from the source thereof, these ports being hereafter termed inlet ports. Ports 53 and 54 register with grooves 46 and 47, respectively, and communicate with the upper and lower ends of the power cylinder through the lines 31 and 32 and are thus properly called motor ports. The ports 55 and 56 which register with grooves 48 and 49 constitute exhaust ports, all of these ports being formed by drilling round holes in the liner. Between the ports 55, which communicate with the groove 48 at the upper end of the liner, the latter is provided with reduced ports 57 which are offset relative to the ports 55 in a direction toward the motor ports 53, the purpose of this offset arrangement will be set forth hereinafter.

The valve spool 51 is provided with a pair of grooves 60 and 61 which are of different lengths, the groove 60 being the shorter and being located below the groove 61 when the valve is disposed as illustrated in the drawings. These grooves provide shoulders on the spool which when the spool is moved, cover and uncover, the ports 52 to 57, inclusive. The spool 51 is further provided with an internal bore 62 extending thereinto from the upper end, a reduced laterally extending port 63 leading from the bore to a small annular groove 64 formed in the spool below the groove 60. This groove 64 registers with the ports 56 in certain longitudinal positions of the spool 51; it is in constant communication with the groove 49 either through the ports 56 or small ports 56A connecting with groove 49 below the ports 56. The sleeve is provided with a longitudinally drilled hole 65 which extends from the upper end of the sleeve to the groove 48. This hole receives a pin 66 carried by the cap 44, the diameter of the hole being such as to provide reduced fluid flow through the drilled hole. The sleeve has a groove extending transversely of the end at the drilled hole to establish communication between the hole and the internal bore. Suitable seals 67 and 68 are provided at the lower ends of the liner and casing to prevent the escape of fluid at these points.

Normally the spool is urged in an upward direction by a coil spring 70 disposed in a counterbore in the cap 44 between a shoulder 71 therein and a spring abutment sleeve 72 surrounding the lower end of the spool or a stem projecting therefrom. This stem is of smaller diameter than the spool to provide a shoulder 73 against which the sleeve 72 may abut. It will be obvious from an inspection of the drawings that the spring will hold the sleeve against the shoulder 73 and urge the spool in an upward direction. To move the spool against the force of the spring, the lower end of the stem 74 is slotted to receive a lever 75, this lever being pivotally connected to the stem as at 76. The lever itself is pivoted as at 77 on a fulcrum member 78 secured to the lower end of the cap 44. The outer end of lever 75 receives a clevis 80 carried by the upper end of a shipper rod 81, this member being connected as at 82 to one end of an actuating lever 83, which is mounted at its intermediate portion, as at 84, for rocking movement.

The outer end of this lever is equipped with a knob 85, the movement of which will effect the operation of the lever. When the knob 85 is moved in a downward direction, the stem and spool will also be moved in a downward direction in opposition to the force of the coil spring 70. After the knob 85 is released, the spring will effect the elevation of the valve spool and the control knob. The valve spool may also be moved in a downward direction in opposition to the force of the spring through the engagement of an arm 86 carried by the ram 38 with a collar 87 secured to the shipper rod 81. This engagement occurs immediately prior to the final stage of retraction of the piston 37 in the power cylinder. When the arm 86 engages the collar 87 and moves this collar in an upward direction, the valve spool will be moved downwardly until the shoulder at the upper end of groove 60 in the spool reaches the lower edges of the inlet ports 52. When this condition exists, the supply of fluid from the pump to the lower end of the power cylinder will be interrupted and the piston will stop moving, the parts of the valve mechanism will then be in the position shown in Fig. 1.

Figure 2:
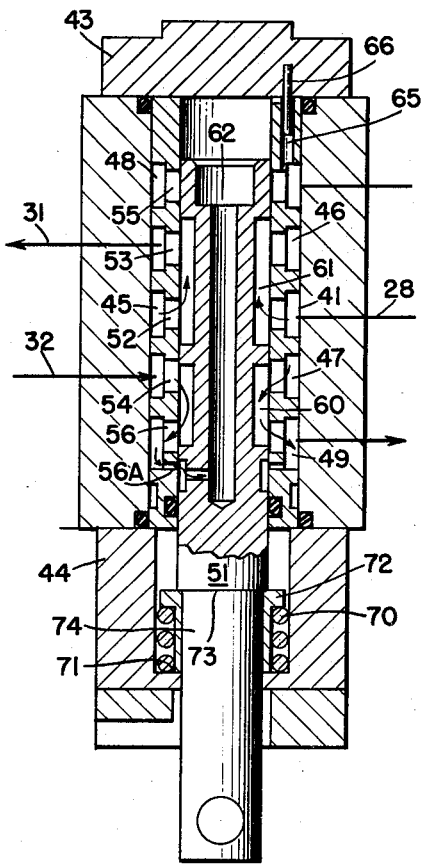
Fig. 2 is a longitudinal sectional view of the control valve showing the same in position to cause movement of the piston in the reversible fluid motor in an outward direction.

When it is desired to cause the ram to perform a working stroke, or, be extended, the knob 85 is moved downwardly until the valve parts occupy the positions shown in Fig. 2, wherein the groove 61 in the spool 51 establishes communication between the inlet port 52 and motor port 53. At this time, the groove 60 in the valve spool will connect ports 54 and 56. Fluid from the source will then flow through the ports 52 and 53 and through line 31 to the upper end of the power cylinder. This fluid will cause piston 37 to move in a downward direction and discharge fluid from the lower end of the power cylinder through line 32; this fluid will flow through ports 54 and 56 and lines 35 and 36 to the reservoir 22. When the piston reaches the lower end of the power cylinder, or, the ram engages an obstruction which offers sufficient resistance to movement thereof, the pressure on the fluid in the system between the pump 23 and the piston 37 will increase until valve 24 operates to by-pass fluid from the pump directly through line 27 to the reservoir. At this time, the ram 38 will be exerting the maximum pressure for which the relief valve 24 has been adjusted. This pressure will be exerted as long as the knob 85 is held in the depressed position. If the knob is released spring 70 will start to expand causing spool 51 to move in an upward direction.

Figure 3:
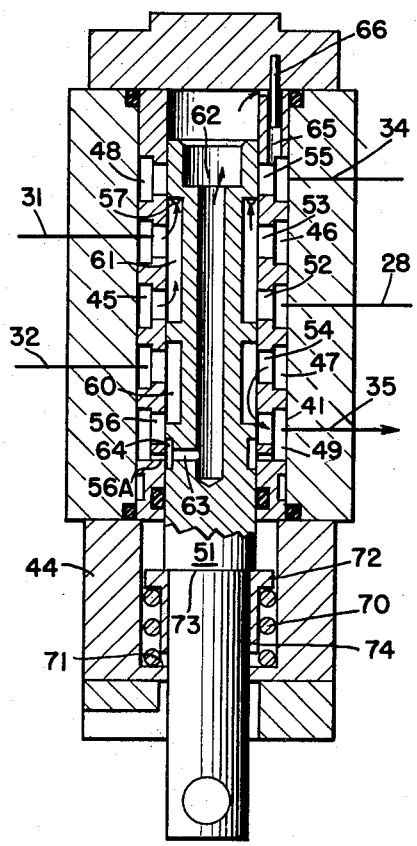
Fig. 3 is a similar view showing the control valve with the parts in the positions they will occupy immediately prior to the reversal of the piston in the fluid motor.
Figure 4:
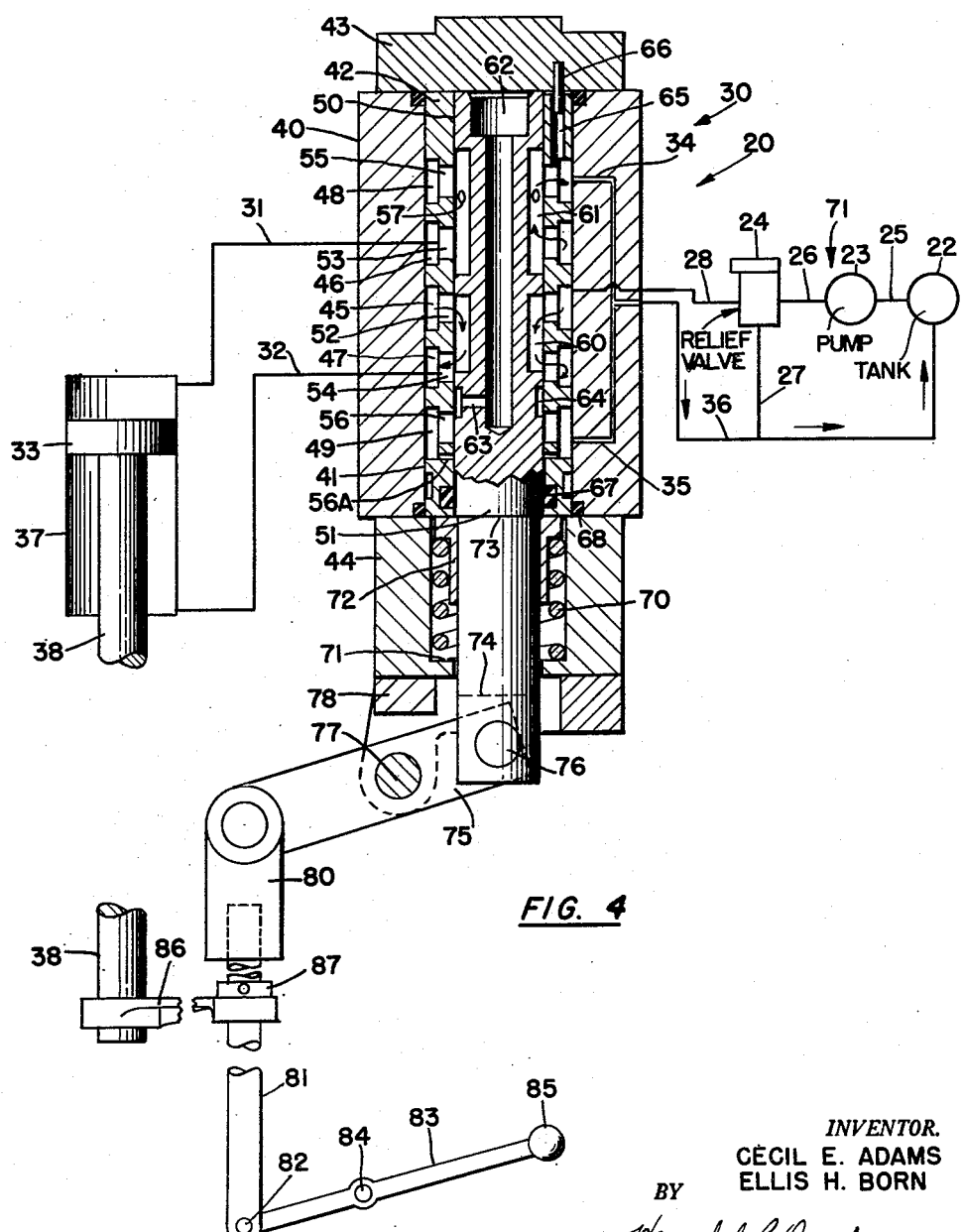
Fig. 4 is a diagrammatic view of the hydraulic system showing the valve parts in the positions they will occupy during the retraction of the piston in the fluid motor.
Figure 5:
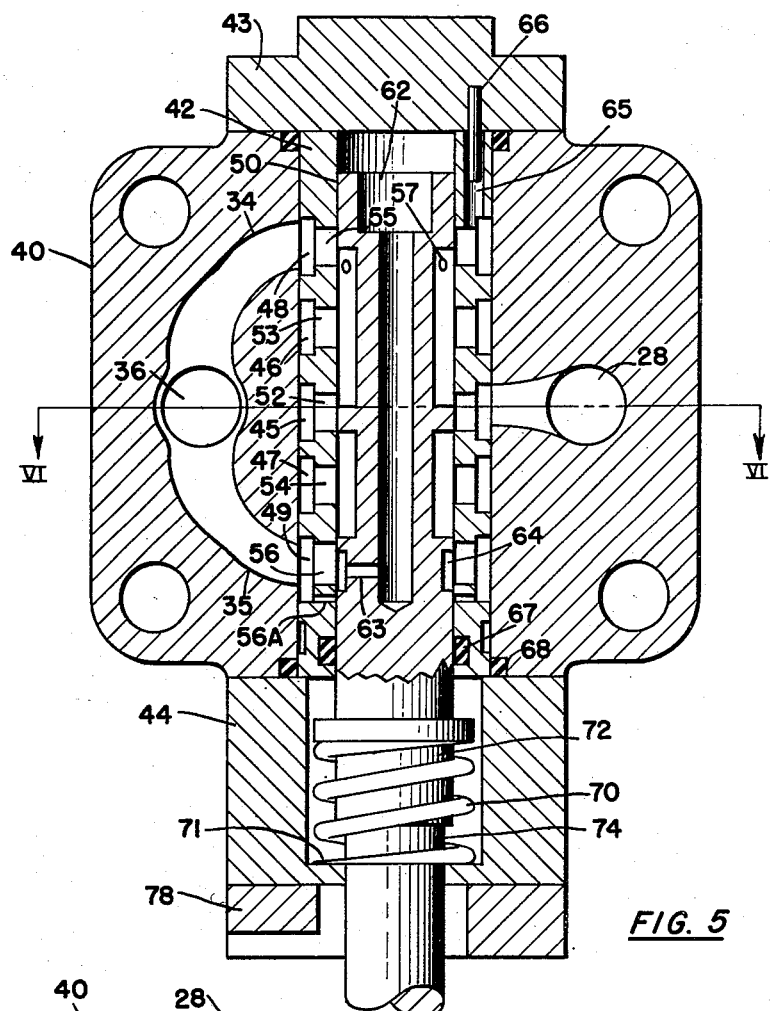
Fig. 5 is a vertical longitudinal sectional view taken through the control valve on the plane indicated by the line V—V of Fig. 1.
Figure 6:
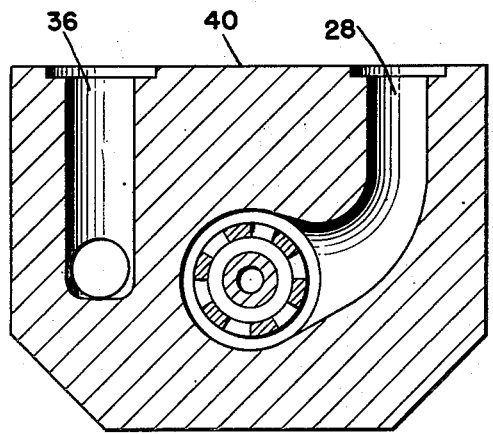
Fig. 6 is a transverse sectional view taken through the valve on the plane indicated by the line VI—VI of Fig. 5, and, Fig. 7 is a diagrammatic view showing a modified form of valve in a hydraulic system, the valve being shown partly in longitudinal section.

It will be observed at this point that when the ram is engaged with the work and the relief valve is by-passing fluid to the reservoir that the pressure of the fluid will exist in lines 28 and 31 and in groove 61, as well as, ports communicating therewith. When the spring 70 moves the spool in an upward direction, fluid is displaced from the upper end of the valve chamber through opening 65 and through the center passage 62 and port 63 to the exhaust grooves 48 and 49. As the spool continues to move, the shoulder at the upper end of groove 61 will start to uncover ports 57. At the instant this uncovering of ports 57 is commenced fluid under high pressure will begin to flow through the small orifice thus created to the exhaust groove 48 and passages 34, 35, and 36; since this fluid is under high pressure, its movement will tend to be very rapid and if unregulated would tend to create a surge of pressure in the exhaust passages of the valve, due to the fact that such exhaust passages contain a body of relatively static oil. For this reason the size and number of holes 57 are small and are exposed relatively gradually. Any pressure generated in the exhaust passages of the valve by the flow of this oil thereinto is transmitted through opening 65, ports 56, 63 and bore 62 in spool 51 to the upper end of the bore in the liner 42 and is applied to the upper end of the spool 51. Since the lower end of the spool is exposed to the atmosphere or a reduced pressure the oil pressure on the upper end tends to move the spool downwardly. This tendency opposes the upward movement of the spool by spring 70. It will be apparent that if the spring tends to move the spool to increase the exposed area of the ports 57, the pressure in the exhaust line will increase and this increased pressure will be applied to the spool to further oppose the upward movement thereof. It will also be apparent that as the fluid under pressure is admitted to the exhaust line the fluid therein will move toward the reservoir and as the volume of fluid being exhausted increases, the rate of movement of the fluid toward the reservoir will be accelerated. When the rate at which the fluid is moving in the exhaust line increases sufficiently to prevent the fluid pressure in such line from further increasing or to cause the pressure in the line to decrease, the valve spool will move further until finally the exhaust ports are completely exposed to the groove 61. Before this complete exposure takes place, the danger of shock due to the connection of high and low pressure zones will be eliminated because the energy stored in the fluid will have been dissipated. It will be apparent from Fig. 3, that after the spool 51 moves in an upward direction and starts to expose ports 57, fluid from the source will be permitted to flow directly to the exhaust without passing to the upper end of the power cylinder. The pressure on the incoming fluid will thus also be dissipated at the same time as the pressure in the upper end of the power cylinder and the line 31, thus when ports 52 are connected with ports 54 no shock will result. After the pressure is dissipated in the above manner, spring 70 will continue to move the spool upwardly until it engages the under side of the cap 43 at which time it will be occupying the position, shown in Fig. 4, wherein groove 61 connects only ports 53 and 55 while groove 60 connects ports 52 and 54. At this time fluid from the pump 23 will be supplied to the lower end of the power cylinder and will move the piston 37 and ram 38 in an upward direction. Fluid in the power cylinder above the piston 37 will be exhausted to the reservoir 22 through line 31, groove 46, ports 53, groove 61, port 55, groove 48, passage 34 and line 36. As the ram and piston approach the upper limit of travel the arm 86 will engage the collar 87 and move it upwardly, as previously discussed, to cause the spool 51 to be moved downwardly until the shoulder at the upper end of groove 60 reaches the lower edges of ports 52 and interrupts the flow of fluid from the pump to the power cylinder. At this time the pump volume will be returned to the reservoir through groove 61, ports 55, groove 48, passage 34 and line 36.

From the foregoing it will be apparent that there has been provided a control valve for reversible fluid motors which will be operative to govern the flow of fluid from a source thereof to such motors to cause forward and reverse operation thereof and to control the connection of sections of hydraulic systems containing fluids at contrasting pressures to eliminate shock, undue wear and noise, the response of the shock-eliminating-control being directly proportional to the contrast in pressures in the portions of the system to be connected. In other words the control will function to the extent and as long as the necessity therefor exists. The principle of operation of the control is the utilization of a pressure surge created in a low pressure zone, by the admission of pressure thereto from a high pressure zone, to control the degree of communication between such zones until the pressures in such zones are substantially equalized, the control functioning according to the need therefor.

An additional advantage resulting from the construction shown is the expelling of air from the upper end of the valve chamber during use of the valve. It is well known that air entrained in the oil collects at or in the highest part of the chamber. If allowed to remain it interferes with the operation of the valve and the system. With the construction disclosed, a slight flow of oil is maintained to the upper end of the valve chamber and from this location through the hole 65 to exhaust. Due to this flow, air reaching the upper end of the valve chamber is caused to flow through the exhaust to the tank from which it may escape to the atmosphere. Since the opening 63 is larger than the effective opening 65 with pin 66 projecting thereinto the flow of fluid will be through the opening 63 into the interior of the spool, upwardly through this spool to the upper end of the valve chamber and outwardly therefrom through the opening 65 to exhaust groove 48.

Figure 7:
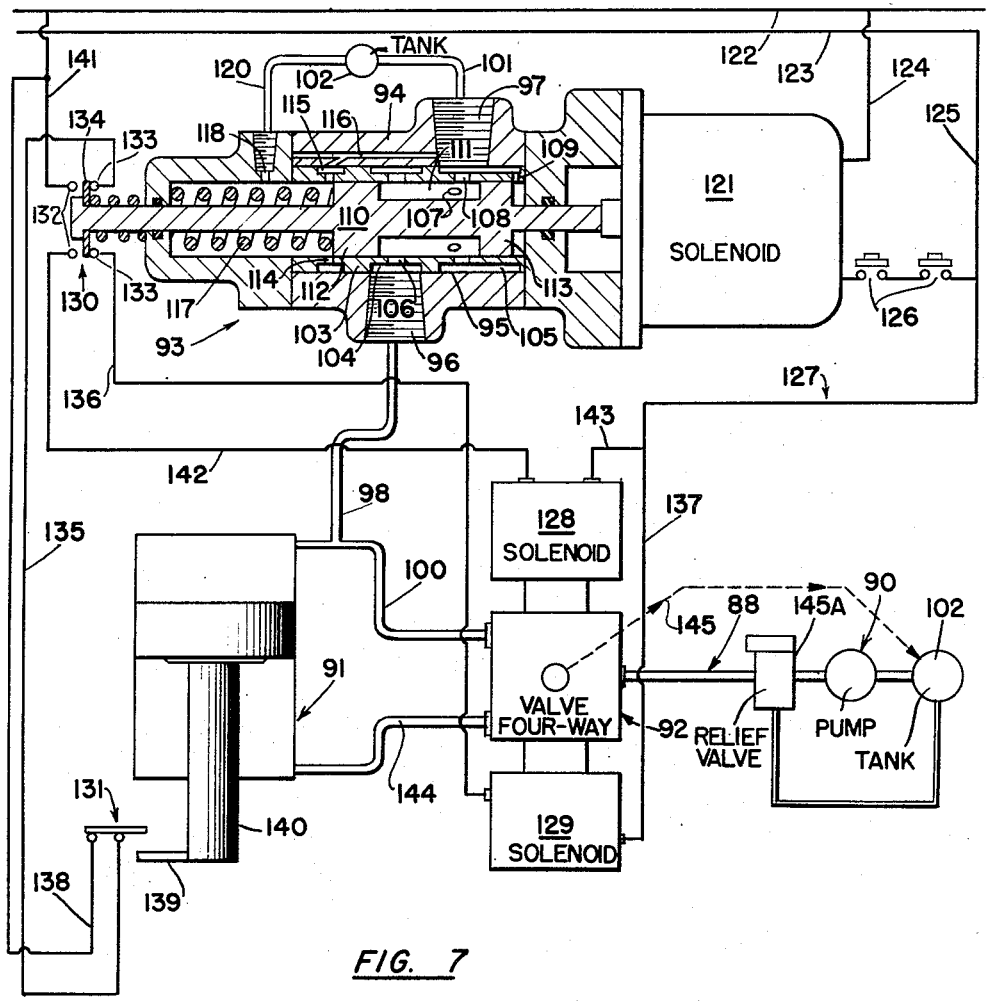

In the foregoing, the invention has been described in association with and forming a part of a control valve of the four-way type. It should be understood at this time that the invention may take other forms, independent of the four-way valve, for example, as illustrated in Fig. 7, the invention may be embodied in a separate unit to function as a decompression valve in a hydraulic system involving a power cylinder of relatively large capacity in which considerable compression of fluid under high pressure may take place. In the form of the invention shown in Fig. 7, the hydraulic system 88 includes a source of fluid pressure 90, a power cylinder 91 and a double solenoid-operated four-way valve 92 for controlling the operation of the power cylinder. The system also includes a decompression valve 93 embodying the principles of this invention, the valve 93 including a body 94 with a chamber 95 and inlet and outlet ports 96 and 97, respectively. The inlet port 96 is connected by line 98 with line 100 leading from the four-way valve 92 to one end of the cylinder 91 and the outlet port is connected by line 101 with the system reservoir 102. The chamber 95 in body 94 contains a sleeve-like liner 103 having spaced external annular grooves 104 and 105, the former registering with the inlet port 96 and the latter with the outlet port 97. Ports 106 connect the groove 104 and the interior of the sleeve while ports 107, 108 and 109 connect groove 105 with the interior of the sleeve at longitudinally spaced points. As in the form of the invention first described, certain ports, designated by numeral 107, are located between other ports 108 and are disposed in closer relationship to the inlet ports 106 so that they will be connected with such ports prior to the connection of ports 108 therewith in the operation of the valve.

Sleeve 103 slidably receives a spool 110 formed with a groove 111 between heads 112 and 113, the groove serving to connect ports 106, 107, and 108 in a certain position of the spool. Port 109 connects groove 105 with the interior of the sleeve beyond head 113 while ports 114, groove 115 and passage 116 connect the outlet port 97 with the interior of the sleeve beyond head 112 when the spool is in position as illustrated in Fig. 7, to connect ports 106, 107 and 108. As the spool moves toward the opposite end of its travel head 112 will close ports 114 and this communication will be interrupted. The interior of the sleeve 103 at the end beyond head 112 is exposed to fluid at atmospheric pressure through reservoir 102 by a port 118 and line 120 which line is separate from line 101 so as to be unaffected by any pressure existing therein.

A coil spring 117 is provided which yieldably urges the spool toward the position illustrated. Spool 110 is arranged to be moved against the force of spring 117 to a position interrupting communication between the inlet and outlet ports by a solenoid 121 disposed at one end of the body. Solenoid 121 receives current from power lines 122 and 123 through lines 124 and 125, the latter having a pair of manually actuated switches 126 therein. A pair of switches are used so that the operator will be required to employ both hands, in the operation of the press, for his protection. The solenoid 121 forms a part of an electrical control circuit 127, which includes the solenoids 128 and 129 of the four-way valve 92; and also limit switches 130 and 131 as well as a plurality of wires connecting these limit switches to the power lines and solenoids.

Limit switch 130 includes two pair of contacts 132 and 133, this limit switch being actuated by the movement of the spool 110 in the valve 93. When the spool 110 is disposed in the position illustrated in Fig. 7, a contactor 134 connected with the spool bridges the contacts 133 and thus connects lines 135 and 136. The latter line leads to one terminal of solenoid 129, the other terminal of which is connected by line 137 with line 125 leading to power line 123; line 135 extends to one of the contacts of limit switch 131, the other contact of this switch being connected by line 138 with power line 122. Limit switch 131 is of the normally closed type and is disposed in a position to be engaged and opened by a finger 139 projecting from the ram 140 of the power cylinder 91. When the piston and ram 140 of the power cylinder 91 closely approach the end of the normal retractive strokes the finger 139 engages the switch 131 and moves it to an open position to prevent current flow to the solenoid 129 and interrupt the motion of the piston and ram. One contact of pair 132 in limit switch 130 is connected by line 141 with power line 122, while the other contact 132 is connected by line 142 with one terminal of solenoid 128, the other terminal of this solenoid being connected by lines 143, 137 and 125 with power line 123.

In the operation of the system the manual switches 126 are closed to complete the circuit for solenoid 121, this solenoid is of the pusher type and moves spool 110 against the opposition of spring 117. When the spool is so moved, head 113 thereof closes ports 107 and 108 to prevent communication between inlet and outlet ports 96 and 97 of valve 93. Immediately before these ports are closed contactor 134 of limit switch 130 bridges contacts 132 and completes the circuit for solenoid 128. When this solenoid is energized fluid will flow from the fluid source 90 through line 88, valve 92 and line 100 to the upper end of the power cylinder 91. This fluid will cause the piston and ram 140 to be extended, the fluid beneath the piston being discharged through line 144, valve 92 and line 145, to the reservoir 102. When ram 140 starts to move finger 138 will be moved away from the limit switch 131 permitting this switch to move to a closed position. The closing of this switch at this time will have no effect, however, since contactor 134 is disposed in spaced relation from the contacts 133. The ram 140 will continue to move in an outward direction as long as the switches 129 are held in a closed position, until the ram engages an obstruction, which will offer sufficient resistance to movement of the ram and piston to cause a relief valve 145A, forming a part of the fluid source, to bypass fluid from the pump back to the reservoir 102. When this fluid is being by-passed the ram 140 will be exerting the maximum force for which the relief valve 145 has previously been adjusted.

When the power cylinder 91 is of considerable size and a large quantity of hydraulic fluid may be received therein, this fluid will undergo some compression as the pressure on the fluid is increased. Since line 98 is directly connected with the top cylinder line 100, this pressure will be transmitted to the inlet port 96 of valve 93. As in the first form of the invention described, valve 93 is provided to permit the pressure on the fluid in the upper end of the power cylinder and lines connected therewith to be dissipated before this end of the power cylinder is connected with the regular exhaust and the other end is connected with the source of pressure through valve 92. The purpose of this pressure dissipation being to reduce the shock on the system and the wear and undue noise associated therewith. After the ram has engaged the work and exerted the required force thereon, the manual switches 126 are permitted to open to interrupt the current flow to the solenoid 121. When this solenoid is deenergized spring 117 will start to move spool 110 to its retracted position illustrated in Fig. 7. As the spool 110 moves under the influence of spring 117 the shoulder at one side of head 113 will start to move past the openings 107. The instant these openings begin to be exposed, fluid pressure which exists in the inlet port 96 and groove 111 will start to escape to groove 105 and exhaust port 97; this escaping fluid under high pressure will engage substantially static fluid in the outlet port 97 and line 101, causing the pressure on this fluid to start to increase; this increase in pressure will exist in groove 105 and will be transmitted through port 109 to the interior of sleeve 103 beyond the head 113. This pressure is applied to the end of the spool 110 and tends to resist movement thereof by spring 117. As the spool continues to move, more area of ports 107 will be uncovered admitting more fluid under high pressure, which will cause the pressure in the outlet port to further increase; this further increasing pressure will be applied to the spool to cause it to tend to resist movement by spring 117. The tension of the spring 117 is so calculated that a predetermined pressure in the outlet port will prevent the spring from moving the spool beyond a point at which the area of the ports 107 exposed will admit fluid under pressure sufficient to maintain the predetermined pressure in the outlet port.

As the pressure in the outlet port starts to decrease, the spring 117 will move spool 110 further to allow more fluid under pressure to escape until substantially all of the pressure on the fluid has been dissipated. When the pressure on the fluid in the power cylinder and line connected thereto has been substantially dissipated, the spool 110 will move far enough to separate the contactor 134 from the contacts 132. When this separation occurs, current flow to solenoid 128 will cease allowing the spool, not shown, in valve 92 to move to center. Also when the fluid pressure has been dissipated, spring 117 will move spool 110 to the limit of its movement in this direction, at which time head 112 will expose the ports 115 in the sleeve 103, which ports connect the passage 116 leading to port 97, with the interior of the sleeve beyond the head 112. This connection causes the pressure at opposite ends of the spool to be equalized and prevents any increase in pressure in the outlet port due to the exhaust of fluid therethrough, resulting from the movement from the piston and ram, from causing spool 110 to again move in opposition to spring 117. When spool 110 reaches its retracted position contactor 134 will bridge contacts 133 and complete the circuit for solenoid 129. When this solenoid is energized, valve 92 is operated to connect line 144 leading to the lower end of the power cylinder with the source of fluid pressure and ram 140 will be retracted. Just before the ram reaches its fully retracted position, the finger 138 will engage and operate limit switch 131 to break the circuit for solenoid 129 and the motion of the ram will be interrupted.

In this form of the invention as in the first form, the operation of the decompression valve depends upon the necessity for such operation. If the pressure in the upper end of the power cylinder is high, the operation of the decompression valve will be commensurate to such high pressure. If the pressure is relatively low, the valve will exercise only the control necessary to cause the relatively low pressure to be dissipated. By providing the passage 116 to admit fluid from the outlet port to the end of the valve spool engaging the spring, the danger of undesired operation is eliminated and no interference will be offered to the discharge of fluid from the power cylinder during the retraction of the ram, nor, will there be any tendency for the circuit for solenoid 129 to be broken.

From the foregoing, it will be obvious that the valve 93 will function, when the controls 126 are released, to dissipate the pressure in the power cylinder before the source of fluid is connected to the lower end thereof to effect the retraction of the ram. The decompression valve in this form functions independently of the four-way valve and may be remotely located with respect thereto. In either case, however, the decompression valve functions in the same manner, that is, to connect the portion of the hydraulic system containing fluid at relatively high pressure to a portion of the system containing fluid at a lower pressure, this connection being accomplished in a controlled manner, the rate at which the connection is established being dependent upon the pressure to be dissipated. A high pressure causing a low rate of establishment of the communication and a lower pressure causing an accelerated establishment of the communication. In both cases, fluid pressure generated by the admission of fluid under high pressure into a portion of the system containing fluid at a lower pressure is used to yieldably oppose the movement of a valve spool toward a communication-establishing position.

It should be obvious that the invention may take forms other than those shown without departing from the spirit and scope as set forth in the following claims.

We claim:

1. In a hydraulic system a source of fluid, a power cylinder having a ram; a fourway control valve between said fluid source and said power cylinder to cause the reciprocation of said ram, said control valve having a body with an inlet connected with said fluid source, motor ports communicating with the ends of said power cylinder and exhaust ports; a spool element disposed for movement in said body, said spool being operative to connect said inlet with either motor port and the other motor port to exhaust; passage forming means on said spool operative in one position of the spool to connect one of said motor ports with one exhaust port while such motor port is connected with said inlet port; spring means normally tending to move said spool through such position to one in which said one motor port is connected only with exhaust; and passage means independent of said motor ports for applying fluid at exhaust port pressure to said spool to tend to resist movement thereof by said spring.

2. In a hydraulic system a source of fluid, a power cylinder having a ram; a fourway control valve between said fluid source and said power cylinder to cause the reciprocation of said ram, said control valve having a body with an inlet connected with said fluid source, motor ports communicating with the ends of said power cylinder and exhaust ports; a spool element disposed for movement in said body, said spool being operative to connect said inlet with either motor port and the other motor port to exhaust; passage forming means on said spool operative in one position of the spool to connect one of said motor ports with one exhaust port while such motor port is connected with said inlet port, one end of said spool being exposed to atmospheric pressure; means independent of said motor ports for applying fluid at exhaust port pressure to the opposite end of said spool; and resilient means tending to move said spool in opposition to said exhaust port pressure.

3. Control mechanism for a reversible fluid motor comprising a body having an internal chamber and spaced inlet, motor and exhaust ports communicating therewith; a liner disposed in said chamber, said liner having ports registering with those in said body; a spool member disposed for movement in said liner, said spool having annular grooves for establishing communication between certain ports in said liner in different positions of said spool in said liner; means yieldably moving said spool toward one end of said liner; passage means independent of said motor ports for conducting fluid at exhaust port pressure to the end of said liner toward which said spool is moved by said yieldable urging means; and means for positively moving said spool in opposition to said urging means.

4. Control mechanism for a reversible fluid motor comprising a body having an internal chamber and spaced inlet, motor and exhaust ports communicating therewith; a spool member disposed for movement in said chamber, said spool having passage-forming means for establishing communication between certain ports in said body in different positions of said spool; resilient means tending to urge said spool to a position in which a certain motor port is connected with said inlet and the other motor port is connected with an exhaust port; passage means separated from said motor ports for conducting fluid at exhaust port pressure to said chamber at one end of said spool to tend to urge the spool in opposition to said resilient means; and means for positively moving said spool in opposition to said resilient means.

5. A decompression valve formed for arrangement between hydraulic system zones containing fluid at contrasting pressures comprising a body with an internal chamber and spaced ports communicating with the different pressure zones; spool means operative in one position to prevent communication between the spaced ports in said body; means for moving said spool to and temporarily retaining the same in said one position; spring means tending to move said spool toward a position in which such communication is established; and passage means extending directly between the port communicating with the lower pressure zone and the chamber in said body at the end of said spool means, said passage means being operative to apply fluid at the pressure in said lower pressure zone to said spool means to oppose movement thereof by said spring means.

6. In a hydraulic system, a source of fluid pressure; a reversible fluid motor; an electro-responsive reversing valve between said fluid pressure source and said motor and connected with each; a decompression valve communicating with said system between said reversing valve and said motor, said decompression valve having a body with a chamber and inlet and exhaust ports spaced longitudinally thereof; a valve spool disposed for movement in said chamber; resilient means tending to retain said valve spool in position to establish communication between said inlet and exhaust ports; electro-responsive means for moving said valve spool to a position interrupting communication between said inlet and exhaust ports; switch means actuated by said valve spool while moving to the last named position to energize said electro-responsive reversing valve to direct fluid pressure to said motor, said switch means maintaining said electro-responsive reversing valve energized after the operation of said motor until the fluid being supplied thereto has been decompressed; and other switch means actuated by said valve spool when moved by said resilient means to energize said electro-responsive reversing valve to direct fluid pressure to said motor to reverse the same.

7. In a hydraulic system, a source of fluid pressure; a reversible fluid motor; an electro-responsive reversing valve between said pressure source and said motor and connected with each; a decompression valve having a body with a chamber and inlet and exhaust ports, the inlet port being connected with said system between said reversing valve and said motor; a valve element movable in said chamber; spring means normally tending to retain said valve element in a first position to establish communication between said inlet and exhaust ports; electro-responsive means for moving said valve element to a second position interrupting communication between said inlet and exhaust ports; switch means controlling the operation of said last mentioned electro-responsive means, said spring means tending to return said valve element to said first position after said electro-responsive means is deenergized; passage means for applying fluid at exhaust port pressure to said valve element to resist movement thereof by said spring means; and additional switch means actuated by said valve element to control the operation of said reversing valve.

8. A valve comprising a body having a chamber and inlet, motor and exhaust ports communicating therewith; a valve element in said chamber operative in one position to establish communication between said inlet and motor ports; yieldable means tending to move said valve element to a second position in which communication is established between said motor and exhaust ports, the pressure from said motor port tending to cause a surge in said exhaust port when such communication is initiated; and a passageway directly connecting said exhaust port and the end of the chamber toward which said yieldable means moves said valve element, fluid pressure from the surge in said exhaust port tending to oppose movement of said valve element by said yieldable means.

9. A valve comprising a body having a chamber and inlet, motor and exhaust ports communicating therewith; a valve element disposed for movement in said chamber, said valve element being operative in one position to establish communication between said inlet and motor ports and in another position to establish communication between said motor and an exhaust port, said valve establishing communication between all three ports when moving from the first to the second position; spring means for moving said valve element from the first-mentioned to the second-mentioned position; and a passageway directly connecting said exhaust port and the end of said chamber toward which said spring moves said valve element, said passageway serving to apply fluid at exhaust port pressure to the end of said valve element to oppose movement thereof by said spring.

10. In a hydraulic system, a source of fluid pressure; a fluid motor; valve means controlling the operation of said motor, said valve means having a body with a chamber and a spool element movable therein, said body having an exhaust passage; yieldable means for moving said spool element through a position in which said motor is simultaneously connected with said exhaust passage and said fluid pressure source; a passageway leading directly from said exhaust passage to one end of said spool, the opposite end of said spool being exposed to atmospheric pressure.

11. In a hydraulic system, a source of fluid pressure, including a reservoir; a fluid motor; a valve mechanism; fluid conductors between said pressure source, said valve mechanism, said motor and said reservoir, said valve mechanism having a portion operative in one position to establish communication between said source and said motor; a second portion in said valve mechanism operative in another position of said valve mechanism to establish communication between said motor and the exhaust conductor leading to said reservoir while the first portion is operative; spring means tending to actuate said mechanism to render said second portion operative and said first portion inoperative; and passage means connected directly with said exhaust conductor for applying fluid at the pressure of said exhaust conductor to said valve mechanism to oppose the actuation thereof by said spring means.

12. In a hydraulic system, a valve mechanism comprising a body with a chamber and an inlet, a motor and an exhaust port spaced longitudinally of the chamber and communicating therewith; a spool member disposed for movement in said chamber, said spool member having port connecting means operative in one position of the spool member to establish communication between said inlet, motor and exhaust ports; means for moving said spool member from said one position to a second position in which communication is established between said inlet and motor ports only; means for returning said spool member to the first-mentioned position; and passage means directly connecting said exhaust port and the chamber for said spool member, said passage means applying fluid pressure from said exhaust port to said spool member to resist movement thereof from said second to said first-mentioned position.

13. In a hydraulic system, a valve mechanism comprising a body with a chamber and an inlet, motor and an exhaust port spaced longitudinally of the chamber and communicating therewith; a spool member disposed for movement in said chamber, said spool member having port connecting means operative in one position of the spool member to establish communication between said motor and exhaust ports and in a second position to establish communication between said inlet, said motor and said exhaust ports; means for moving said spool member from the first-mentioned position through the second position to a third position in which communication is established between said inlet and motor ports only; means for returning said spool member from the third through the second to the first-mentioned position; and passage means directly connecting said exhaust port and the chamber for said spool member, said passage means applying fluid pressure from said exhaust port to said spool member to resist movement thereof by said returning means.

14. In a hydraulic system, a valve mechanism comprising a body with a chamber and an inlet, a motor and an exhaust port spaced longitudinally of the chamber and communicating therewith; a spool member disposed for movement in said chamber, said spool member having port connecting means operative in one position of the spool member to establish communication between said inlet, motor and exhaust ports; means for moving said spool member from said one position to a second position in which communication is established between said inlet and motor ports only; spring means tending to move said spool member from the second to the first-mentioned position; and passage means directly connecting said exhaust port and the chamber for said spool member, said passage means directing fluid pressure from said exhaust port against said spool member to resist movement thereof by said spring means.

References Cited in the file of this patent

UNITED STATES PATENTS

| Number | Name | Date |
|---|---|---|
| 853,693 | Healey | May 14, 1907 |
| 1,533,800 | Hennebohle | Apr. 14, 1925 |
| 1,964,196 | Cuttat | June 26, 1934 |
| 2,002,717 | Robart | May 28, 1935 |
| 2,219,896 | Harrington et al. | Oct. 29, 1940 |
| 2,335,809 | Stacy | Nov. 30, 1943 |
| 2,367,241 | Stacy | Jan. 16, 1945 |
| 2,374,593 | Ernst et al. | Apr. 24, 1945 |
| 2,410,404 | Buchanan | Nov. 5, 1946 |
| 2,416,722 | Waldie | Mar. 4, 1947 |
| 2,448,557 | Stephens | Sept. 7, 1948 |
| 2,464,283 | Adams | Mar. 15, 1949 |
| 2,590,137 | Towler | Mar. 25, 1952 |
| 2,609,794 | Towler | Sept. 9, 1952 |

FOREIGN PATENTS

| Number | Country | Date |
|---|---|---|
| 524,564 | Great Britain | Aug. 9, 1940 |